(12) United States Patent
Guggilla et al.

(10) Patent No.: US 10,936,970 B2
(45) Date of Patent: Mar. 2, 2021

(54) MACHINE LEARNING DOCUMENT PROCESSING

(71) Applicant: ACCENTURE GLOBAL SOLUTIONS LIMITED, Dublin (IE)

(72) Inventors: Chinnappa Guggilla, Bangalore (IN); Madhura Shivaram, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 802 days.

(21) Appl. No.: 15/783,879

(22) Filed: Oct. 13, 2017

(65) Prior Publication Data

US 2019/0065991 A1 Feb. 28, 2019

(30) Foreign Application Priority Data

Aug. 31, 2017 (IN) .............................. 201711030812

(51) Int. Cl.
*G06N 20/00* (2019.01)
*G06F 16/332* (2019.01)
*G06F 16/33* (2019.01)

(52) U.S. Cl.
CPC ......... *G06N 20/00* (2019.01); *G06F 16/3329* (2019.01); *G06F 16/3344* (2019.01)

(58) Field of Classification Search
None
See application file for complete search history.

(56) References Cited

U.S. PATENT DOCUMENTS

2017/0185581 A1  6/2017  Bojja et al.

FOREIGN PATENT DOCUMENTS

RU        2628431 C1    8/2017

OTHER PUBLICATIONS

Burges, et al., Learning to Rank using Gradient Descent, Proceedings of the 22nd International Conference on Machine Learning, 2005, pp. 1-8 (Year: 2005).*
Frederic Godin et al., "Using Topic Models for Twitter Hashtag Recommendation", International World Wide Web Conference Committee (IW3C2). WWW 2013 Companion, May 13-17, 2013, ACM 978-1-4503-2038-2/13/05, pp. 593-596.

* cited by examiner

*Primary Examiner* — Wilbert L Starks
(74) *Attorney, Agent, or Firm* — Mannava & Kang, P.C.

(57) ABSTRACT

A machine learning document processing system performs natural language processing (NLP) and machine learning to determine a subset of documents from a document dataset based on the structural features and semantic features. The system facilitates an interactive process, e.g., through a client application, to receive user input from a user to identify documents with a specific document feature category. The user input may be provided from a user as speech or text, and NLP is performed on the user input to determine user intent, the document features, and document feature category. Using the user intent and the additional document feature category, the system identifies subsets of the document dataset that matches the document feature category for display.

20 Claims, 9 Drawing Sheets

MACHINE LEARNING DOCUMENT PROCESSING

PRIORITY

The present application claims priority under 35 U.S.C. 119(a)-(d) to Indian patent application number 201711030812, having a filing date of Aug. 31, 2017, the disclosure of which is hereby incorporated by reference in its entirety.

BACKGROUND

Document processing typically involves processing a document, for example, from a word, pdf or another file, to ascertain, detect, and classify particular features in the document. Optical character recognition may be applied during the document processing to detect a particular feature in the document such as a text file. Document processing with optical character recognition has a wide variety of applications, such as converting scanned documents into editable text, detection of documents in scanned documents, and the like. However, document processing using optical character recognition typically does not consider characteristics of a large corpus of documents, which may result in less accurate document processing results.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
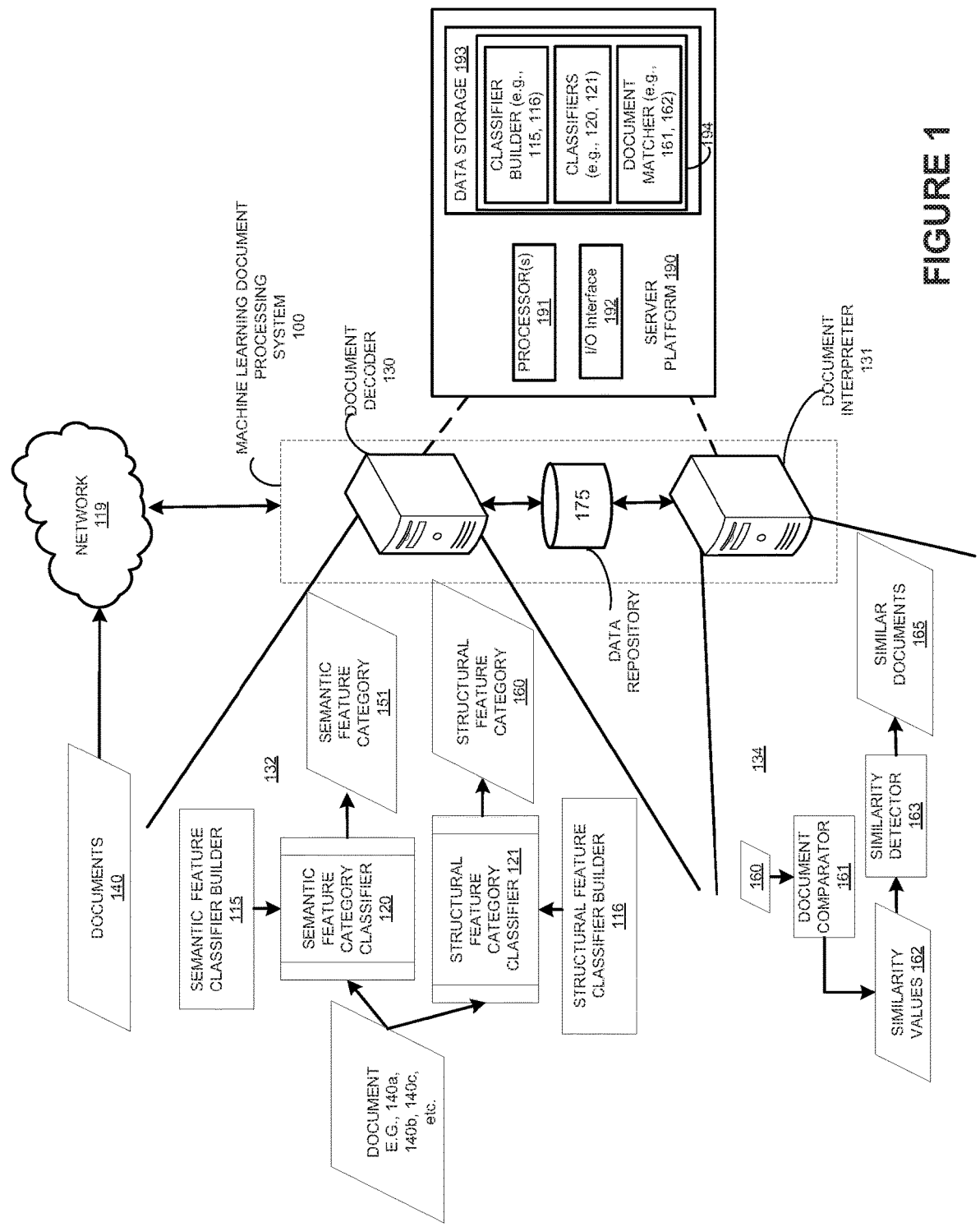
FIG. 1 shows a system diagram of a machine learning document processing system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "an" and "an" are intended to denote at least one of a particular element, the term "includes" means includes but not limited to, the term "including" means including but not limited to, and the term "based on" means based at least in part on.

A machine learning document processing system, according to an example of the present disclosure, builds and trains multiple machine learning classifiers, such as K-nearest neighbors (k-NNs), recurrent neural networks (RNNs) and convolutional neural networks (CNNs) or machine learning clustering such as K-means. The machine learning classifiers may extract features in documents in a document data set stored in a data repository, perform document processing to detect features of the documents, determine document feature category and classify the documents in the document data set based on the document feature category. In an example, features of the documents may be semantic features or structural features. Semantic features may be a phrase, a clause, a word or the like. Structural features may be spaces, punctuation marks, tables, figures, the layout of the document and the like. In an example, the system may identify similar sets of documents or dissimilar sets of documents based on the document feature category. In another example, the system may identify documents that are outliers in a set of documents. Also, the system may identify the category of documents that do not have enough documents for machine learning or determine when the count of documents in the category of documents is skewed and may result in inaccurate analysis due to the skew.

K-nearest network classifiers may detect and classify features of documents based on the features in the documents. The machine learning document processing system, according to an embodiment, provides a method for building and training k-NNs to output a classification of a document depository. In another example, k-means cluster grouping may detect and group features of documents based on the features in the documents.

In another example, CNNs include many layers to detect and classify particular features of documents relevant to a problem in hand. Furthermore, each layer of the CNN typically has a multitude of parameters associated with it. The specific values of those parameters for a successful and accurate document classification may not be known a priori. In another example, a recurrent neural network (RNN) may classify particular features of documents relevant to a problem at hand. The machine learning document processing system, according to an embodiment, provides a method for building and training k-NNs and/or CNNs to output an accurate classification of a document depository.

Multiple machine learning classifiers may be built and trained by the machine learning document processing system. The system may include a document decoder that includes the semantic feature category classifier and structural feature category classifier. According to an example of the present disclosure, a first machine learning classifier built and trained by the machine learning document processing system may be a semantic feature category classifier. According to another example of the present disclosure, a second machine learning classifier built and trained by the machine learning document processing system may be a structural feature category classifier. The semantic category classifier may be trained to identify document texual features from a document provided to the semantic category classifier, determine a semantic category for the textual features and determine the semantic feature category for the each of the documents in the data repository.

The semantic feature category classifier may be trained to identify document texual features from a target document, determine a semantic feature that corresponds to the textual features and determine the semantic feature category for the documents in the data repository. The document decoder may be provided with any document such as a document from the repository. The textual feature may include one or more words, images or white space characters. For example, a document from the data repository may include semantic features such as clauses, phrases or two or more words, or other features in the documents such as pictures, tables, white space characters in the documents such as tabs, spaces, punctuation marks, tables and the like. The semantic feature category classifier may determine the semantic feature category, identify the textual features in the document from the data repository, determine the semantic feature that corresponds to the textual feature in the document such as a document from the data repository and classify the documents into the semantic document category. In an example, the semantic feature may be represented as high-level abstractions represented by vectors in an n-dimensional vector space. In an example, the semantic feature category classifier may determine the semantic feature category based on the nearest neighbor of the document with similar semantic features in a k-dimensional vector space of semantic features. Similarly, the semantic feature category classifier may be trained to determine the structural features in the document from the data repository and classify the document based on the structural features identified in the documents in the data repository. In an example, the semantic structural feature classifier may determine the structural feature category based on the nearest neighbor of the document with similar structural features in a k-dimensional vector space of structural features.

The structural feature category classifier may be trained to identify textual features from a document such as a document from the data repository, determine a structural feature for each of the textual features and determine the structural feature category for the documents in the data repository. In an example, the document decoder determines the semantic feature category of the documents in the data repository using the semantic feature classifier, and the structural feature category classifier determines structural features of the documents in the data repository. The document decoder may then determine the document feature category for the documents in the data repository based on the semantic feature category, structural feature category or both.

The examples of the present disclosure are generally associated with document processing using machine learning. A technical problem associated with document processing is determining document count sufficiency for machine learning. For example, determining whether the count of documents in a category in comparison to documents in other categories of the data set allows computers to determine whether machine learning will translate to similar real world results when applied to a larger data set.

With reference to FIG. 1, there is shown a system diagram of a machine learning document processing system 100, according to an example of the present disclosure. The system 100 is referred to as machine learning because it may use machine learning functions to generate classifiers to determine document feature category 275. Examples of classifiers that may be created and used in the system 100 are k-NNs and CNNs, as is further discussed below. It should be understood that the system 100 may include additional components and that one or more of the components described herein may be removed and/or modified without departing from a scope of the system 100. The system 100 may include a document decoder 130, a document interpreter 131 and a data repository 175.

The system 100 may receive documents 140, and the documents 140 may be stored in the data repository 175. The documents 140 may be received via network 119. The documents 140 may be provided in files, e.g., Portable Document Format, Microsoft Word File, Rich Text Format or Microsoft Outlook Message files. The documents 140 may be provided in digital audio, and the system 100 may use natural language processing to convert the digital audio into text files. Any number of sources may provide the documents 140.

The network 119 may include local area networks (LANs) and wide area networks (WANs), such as the Internet. The network 119 may include signal bearing mediums that may be controlled by software, applications and/or logic. The network 119 may include a combination of network elements to support data communication services. The network 119 may encompass wired and/or wireless network technologies.

Examples of operations performed by the document decoder 130 are shown at 132. For example, the document decoder 130 may include a semantic feature category classifier builder 115 that builds semantic feature category classifier 120. Test data sets and validation sets may be created, for example, from the documents 140 or other documents, and may be used to build and validate the semantic feature category classifier 120. Building and validating the semantic feature category classifier 120 is further described with respect to FIGS. 2 and 3. The semantic feature category classifier 120, for example, is trained to identify classes (i.e., category) of semantic features in documents and classify documents. The training data for the semantic feature category classifier 120 may include documents, each having one or more semantic features and a class for each semantic feature in the document.

After building the semantic feature category classifier 120, the semantic feature category classifier 120 may be used to identify semantic features in documents and classify documents into semantic feature category 151. In an example, semantic feature category may be a category that includes documents with a certain phrase, a clause, a word or the like. Document 140a is a document provided as input to the semantic feature category classifier 120, and the semantic feature category classifier 120 determines whether the document 140a contains a semantic feature in one of the categories for which it was trained. In an example, the document 140a may be a document from the data repository 175. If the semantic feature category classifier 120 determines that the document 140a contains a semantic feature in one of the classes, the semantic feature category classifier 120 classifies the document 140a in the corresponding semantic feature category 151 having the feature or features of the document 140a.

A structural feature category classifier builder 116 builds structural feature category classifier 121. In an example, structural feature category 160 may be documents with tabular columns to hold information, documents with sentences ending in two spaces and the like. Test data sets and validation sets may be created, for example, from the documents 140 or other documents, and may be used to build and validate the structural feature category classifier 121. Building and validating the structural feature category classifier 121 is further described with respect to FIG. 2. The structural feature category classifier 121, for example, is trained to identify classes (i.e., category) of documents that have similar structural features.

After building the structural feature category classifier 121, the structural feature category classifier 121 may be used to determine features of documents. For example, the document may be classified into a structural feature category 160. The structural feature category classifier 121 determines whether the document 140a is in a class for which it was trained to identify. Also, the document decoder 130 may use the structural feature category classifier 121 in conjunction the semantic feature category generated by the semantic feature category classifier 120 to determine the document feature category 275. In an example, the document feature category 275 may be determined using the semantic feature category 151. In another example, the document feature category 275 may be determined using the structural feature category 160. In another example, the document feature category 275 may be determined using the structural feature category 160 and the semantic feature category 151.

For example, the semantic feature category classifier 120 may use K-nearest neighbors algorithm a non-parametric method used for classification and regression. In k-NN classification, the output is a class membership such as semantic feature category 151 or structural feature category 160. In k-NN regression, the output is the property value for the object. This value is the average of the values of its K-nearest neighbors. In another example, the semantic feature category classifier 120 or structural feature category classifier 121 may use k-means machine learning for clustering or grouping. In another example, the semantic feature category classifier 120 may have multiple convolutional layers, fully connected layers, and binaries sigmoidal layer. In an example, the document feature category 275 may be stored in the data repository 175 and may be used by the document interpreter 131 to identify similar documents, as is further described below.

Examples of operations performed by the document interpreter 131 are shown at 134. The document interpreter 131 can compare the document 140a to other documents in the data repository 175 to identify documents that are similar to the document 140a. Features of the documents may be compared to determine how similar the documents are to each other. The documents being compared to the document 140a and/or document data for those documents, including their features, may be stored in the data repository 175. The document interpreter 131 may include a document comparator 161 that compares the structural feature category 160, the semantic feature category 151, the document feature category 275 or a combination thereof to compare documents such as the document 140a. In an example, the document interpreter 131 may use features, for example, received from the user to identify a subset of documents that match the user inputs. The output of the document comparator 161 may include similarity values 162 that represents how the structural feature category 160, the semantic feature category 151, the document feature category 275 or a combination thereof and the features of features received from the user. In an example, to determine the similarity between the features and the structural feature category 160, the semantic feature category 151, the document feature category 275 or a combination thereof, a vector distance may be calculated. Determining the similar documents 165 that are the most similar to the semantic feature category 151 or the structural feature category 160 or both may be used for a variety of applications. Examples of applications include recognizing the type of documents based on the format detected, segregating documents into simple documents and complex documents, topic based document grouping and segregating sensitive and non-sensitive documents. In another example, similar documents but not exact documents are identified by the document interpreter 131, as is further discussed below.

Server platform 190 is an example of hardware that may be used in the document decoder 130 and the document interpreter 131. In an example, the document decoder 130 and document interpreter 131 may be implemented on servers. It should be understood that the server platform 190 may include additional components and that one or more of the components described herein may be removed and/or modified as is known to one of ordinary skill in the art.

The server platform 190 may include one or more processors 191, data storage 193, and an input/output (I/O) interface 192. The components of the server platform 190 are shown on a single computer or server as an example, and in other examples, the components may exist on multiple computers or servers. The server platform 190 may store data in the data storage 193 and/or may manage the storage of data stored on a separate computing device, for instance, through the I/O interface 192. The data storage 193 may include physical memory, a hard drive, an optical drive, a flash drive, an array of drives, or any combinations thereof, and may include volatile and/or non-volatile data storage.

The processor 191, which may comprise a microprocessor, a microcontroller, an application-specific integrated circuit (ASIC), Graphical Processing Unit or the like, is to perform various processing functions of the respective server. The processing functions may include classifier building functions, such as performed by semantic feature category classifier builder 115 and the structural feature category classifier builder 116, document matching functions, such as performed by the document comparator 161 and the similarity detector 163, and other functions. The processing functions performed by the document decoder 130 and the document interpreter 131, and other functions, operations, and methods described herein may be embodied as machine readable instructions 194 that are stored in a non-transitory computer readable medium, such as the data storage 193, and executed by a processor, such as a processor 191. The document interpreter 131 and the document decoder 130 may use machine learning to perform the processing functions. In addition to storing the machine readable instructions 194, the data storage 193 may store data or functions, such as classifiers which may include the semantic feature category classifier 120 and the structural feature category classifier 121. The document decoder 130 and the document interpreter 131 are shown as separate servers. However, the functions and operations of these servers may be performed on a single server or multiple servers which may be connected via a network.

The I/O interface 192 includes a hardware and/or a software interface. The I/O interface 192 may be a network interface connected to a network through a network device, such as a router. For example, the I/O interface 192 may be a wireless local area network (WLAN) or a network interface controller (NIC). The WLAN may link to the network device through a radio signal. Similarly, the NIC may link to a network device through a physical connection, such as a cable.

The data repository 175 may include a database comprised of database tables or another type of data storage system. The data repository 175 can be implemented as a standalone or distributed repository.

Although the classifier is described above with reference to K-NN other machine learning algorithms such as classifiers including deep learning classifiers, reinforcement learning, semi-supervised learning, cluster analysis, hierarchical clustering, association rule learning, artificial neural network, unsupervised learning, linear classifier, decision tree, Bayesian analysis, and the like. Some examples of such machine learning classifiers that may be used includes CNN, RNN including Long Short Term Memory or a combination of the classifiers. In other examples, k-means machine learning may be used to cluster or group the features of the documents.

Similarly, in an example, segmentation may be used to generate parts of an image for further analysis. For example, the documents with images may be segmented into parts to locate objects and boundaries of objects in the images of the document. Format extractors such as kermitt2/grobid may be used to extract information from documents such as references and for parsing pdf articles. Also named entity extraction may be used to locate and classify named entities in text into predefined categories such as names of persons, organizations, locations, expressions of times, quantities, monetary values, percentages and the like. Examples of methods that may be used for phrase classification may include tokenization of sentences to unigram tokens, stemming techniques such as lemmatizer, term document matrices, Naïve Bayes classifier and the like.

Figure 2:
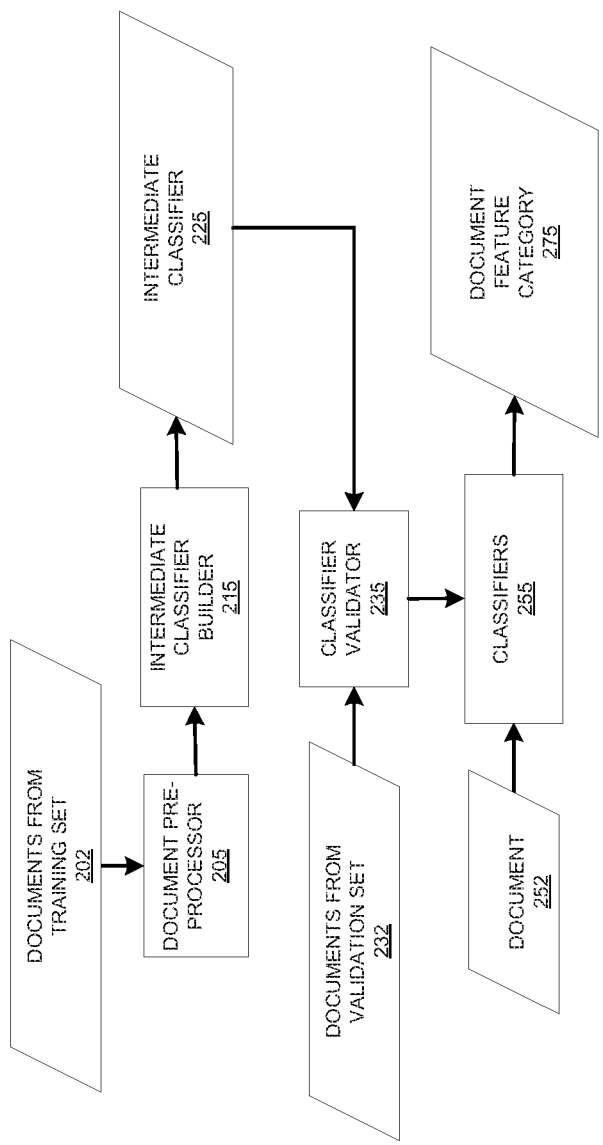
FIG. 2 shows the generation of a machine learning classifier, according to an example of the present disclosure.

FIG. 2 shows an example of operations for generating classifiers 255, which may include operations performed by the semantic feature category classifier builder 115 and the structural feature category classifier builder 116 to build the semantic feature category classifier 120 and the structural feature category classifier 121 respectively. The training sets may include supervised training sets that include documents with known structural feature category, semantic feature category, which, is used to train the classifiers to generate the classifiers 255, such as the semantic feature category classifier 120 and the structural feature category classifier 121. The document decoder 130, for example, may receive documents 202 from a labeled training set at a document pre-processor 205. In an example, the document pre-processor may isolate the structural features. Examples of structural features may include number of tabs in a line, number of tabs in next line or two lines, number of spaces in a line, number of colons in a line, no of words starting with capital letter in a line number of sentence length (in words), number of blank lines next to the current line, number of dates per line, number of numerical values per line, ratio of number of spaces to total number of spaces per line, ratio of number of tabs to total number of tabs per line, number of parenthesis per line, number of slashes per line, number of commas per line, number of stop words per line, number of tabs preceding to the current word, number of tabs preceding to the first word, number of tables, number of images/figures, number of graphs, number of sections/titles, semantic errors such as spelling errors, number of footers, water marks, depth of numbers and tags in XML/JSON.

The preprocessed documents from the training set may be input to the intermediate 215. The intermediate classifier builder 215 may select various architectures and parameters to train an intermediate classifier 225. The intermediate classifier 225 may be then be evaluated on documents 232 in a validation set. Classifier validator 235 may determine whether to flag the intermediate classifier 225 as meeting a designated validation threshold. If the intermediate classifier 225 does not meet the validation threshold, the intermediate classifier 225 is not flagged and continues to be trained on the documents 202 from the training set by the intermediate classifier builder 215. Shared weights of the classifier may be adjusted in an iterative process until the validation threshold is met. When the intermediate classifier 225 meets the validation threshold, the intermediate classifier 225 may be selected as the classifier 255. The classifier 255 may be used to classify documents, such as document 252, into a class or category at 275. The classification may be a prediction of whether the document belongs to the class or category. The prediction may be accompanied by a confidence value that indicates the accuracy of the classification.

In an example, the k-NN classifier trained as described may map the documents 140 to cluster centroids that are structurally or semantically similar or structurally and semantically similar, i.e., determine the document feature categories that are structurally or semantically similar or structurally and semantically similar. For example, the doc2vec algorithm may be used by the semantic category classifier and the structural category classifier. The document decoder 130 may determine the appropriate document semantic category for a document based on mathematical operations such as distance from the centroid for the new document in relation to other documents in the training set at a similar distance from the centroid.

Figure 3:
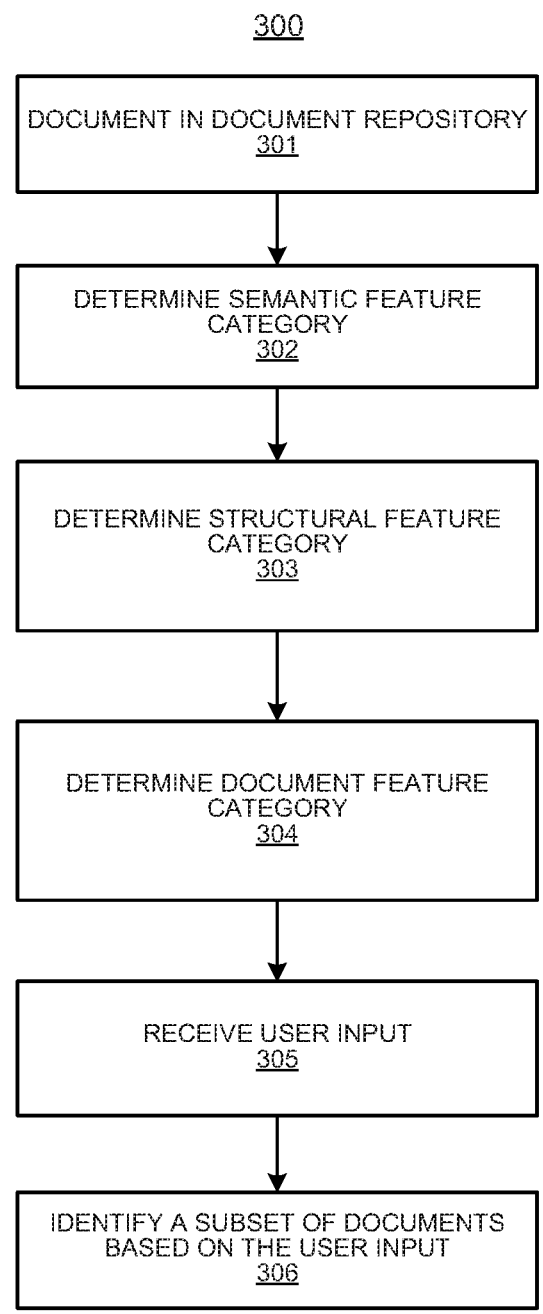
FIG. 3 shows a flow chart of a method to identify a subset of documents with similar document features, according to an example of the present disclosure.

FIG. 3 shows an example of a method 300. The method 300 and other methods described herein may be performed by one or more servers or other types of computers including at least one processor executing machine readable instructions embodying the methods. For example, the document decoder 130 and/or the document interpreter 131 shown in FIG. 1 may store machine readable instructions 194 embodying the methods, and processor 191 may execute the machine readable instructions. The method 300 is described by way of example as being performed by the system 100. The method 300 may be performed to determine feature categories for each of the documents 140, which may be stored in the data repository 175. Also, the method 300 identifies a subset of the documents 140 based on user input and the document feature categories.

At 301, the document 140a may be retrieved from the data repository 175 and input to the document decoder 130. At 302, the semantic feature category for the document 140a is determined. As discussed above with respect to FIG. 1, the semantic feature category classifier 120 may identify the semantic feature category 151 of the document 140a. The semantic feature category classifier 120 may identify the textual feature vectors in each of the documents stored in the data repository 175. The semantic feature category classifier 120 may determine the semantic feature vectors for the determined textual feature vectors for each document in the data repository 175. For example, the semantic feature category classifier 120 may identify the semantic feature vectors that correspond to the textual features in the documents using an existing corpus such as word2vec or doc2vec. In an example, the semantic feature category classifier may convert the textual features into a vector representation of the semantic features in k-dimensional space where k is a value greater than one. In an example, the semantic feature category classifier 120 may identify documents with that are close to other neighbors in the k-dimensional space. The semantic feature category classifier 120 may determine the semantic proximity value for each document to other documents in the data repository based on the semantic features for each document. Thus, the semantic feature category classifier 120 may determine the semantic feature category for each document in the data repository 175.

At 303, the document 140a is applied to the structural feature category classifier 110 to determine the structural feature category 160 of the document. As described above with respect to FIG. 1 the structural feature category classifier 121 may identify structural features from the document 140a. Examples of structural features that may be identified by the structural feature category classifier 121 include as the number of tabs in a line, number of tabs in next line or two lines, number of spaces in a line and the like as described above. The structural feature category classifier 121 may determine the structural features for each document. The structural feature category classifier 121 may determine the structural feature vectors for each document, and determine the structural proximity value for each document to other documents in the data repository based on the structural features for each document. In an example, the structural proximity value for each document may be determined using a KNN, wherein the nearest neighbor with similar features may be used to determine the structural feature vectors. The structural feature category classifier 121 may determine the structural feature category 160 for the document 140a based on the structural proximity value. In another example, the structural feature category classifier 121 and the semantic feature category classifier 120 may both be used to determine the semantic feature vectors and the structural feature vectors and document proximity value for each document to other documents in the data repository based on the structural feature vectors and the semantic feature vectors may be identified. The document decoder 130 may determine the document feature category 275 of each document based on the document proximity value of the document to other document in the data repository.

The document decoder 130 may also determine the document feature category 275 based on semantic errors in the document and use the semantic errors in addition to the structural proximity values and the semantic proximity values. For example, the document decoder 130 may classify documents with tabular columns with spelling errors for the value accounting. In another example, the document decoder 130 may use a document language to classify documents, also, the structural proximity values and the semantic proximity values.

At 304, the document decoder 130 may determine document feature category 275 for the document 140a from the semantic feature category 151, and the structural feature category 160 determined at 302 and 303. For example, the document decoder 130 may use the semantic feature category 151 to determine the nearest neighbor in vector space with a combined vector space based on both categories. As discussed above with respect to FIG. 1, the document decoder 130 may use the structural feature category 160, the semantic feature category 151, or a combination to determine the document feature category 275. In an example, the document decoder 130 may use the document proximity value of the document to other documents in k-dimensional vector space to determine the document feature category 275 by identifying the nearest neighbor. Thus, the document decoder 130 may classify each document in the data repository 175.

At 305, the document interpreter 131 may obtain user input via the network interface. In an example, the user input may be an audio input and the system 100 may use natural language processing to determine the intent of the user and identify at least one document feature. In an example, the user input may identify a document. In another example, the user input may identify a document feature or a document feature category 275. The user input may be a query to identify documents of interest to a user such as invoices, responses to certain queries to customer support, documents with personally identifiable information and the like. The document interpreter 131 may convert the user input into a query document feature category 275. The document interpreter 131 may use the document decoder 130 to classify the document identified by the user to determine the query document feature category 1101.

At 306, the document interpreter 131 may identify a subset of documents that match the query document feature category 275 to identify documents that match the query document feature category 1101 in the data repository 175. For example, the document interpreter 131 may identify documents that are similar to the documents that are determined have a similar document feature category 275 by the document decoder 130. In another example, the document interpreter 131 may identify a subset of documents that match the document feature category 275 based on the nearest neighbors of the document identified by the user or documents that are in the k-dimensional vector space with similar properties. In another example, the document interpreter 131 may identify a subset of documents, in a document feature category 275 based on the document topic. In another example, the document interpreter 131 may identify a subset of documents in a document feature category 275 based on a personally identifiable information in a document. Examples of personally identifiable information may include social security numbers, bank account, passport number, date of birth and the like. In another example, the document interpreter 131 may identify documents based on a count of structural features in each document. As discussed above structural features may be the number of tabs, the number of colons, the layout of the document and the like. In an example, the document interpreter 131 may determine the documents of interest with the similar structural and semantic features based on the distance between the centroid and the document properties based on a training set after converting the query into structural and functional properties in the k-dimensional vector space. In an example, the document interpreter 131 may determine a relevancy score to determine the relevant documents in the k-dimensional vector space. In an example, the document interpreter 131 may determine the relevancy score based on the training set centroid distance and the distance of the doc2vec semantic vector distance in the k-dimensional space for a document identified in the query.

The system 100 may then transmit the matching subset of documents to a client application for display on the client application. In another example, the system 100 may determine whether there are a minimum number of documents in each document feature category 275 that are varied enough for machine learning, i.e., is sufficient, or there is a skew in a document feature category 275. For example, there may be a skew in the number of documents in a certain document feature category. The system 100 may determine a count of the document in each document feature category 275 identified by the document decoder 130. The system 100 may then determine whether there are more documents in one or more document feature categories or whether there is skew in one or more document feature categories with respect to other document feature categories. The system 100 may then use the document skew in the data repository 175 to determine that there are insufficient documents in one or more document feature categories. The system 100 may also request additional documents in a document feature category 275 to rectify the skew once a skew in documents in one or more document feature categories is identified.

Figure 4A:
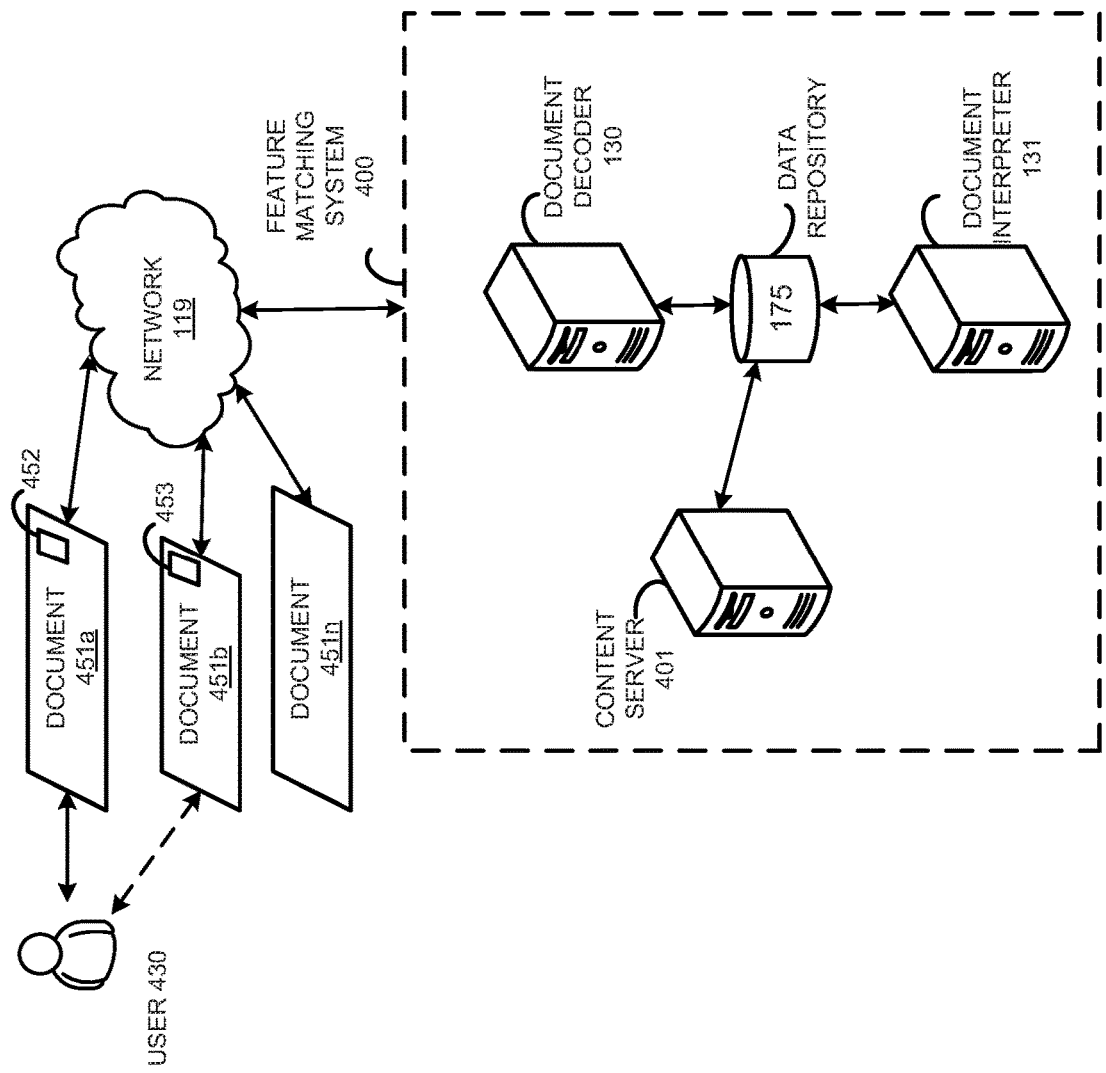
FIG. 4A shows a feature matching system, according to an example of the present disclosure.

The system 100 may be used for a variety of applications. One example of an application of the system 100 is to identify and deliver a subset of documents that include structural features such as tables or columnar formats for presenting data. FIG. 4A shows an example of a feature matching system 400 that may include the system 100. For example, the feature matching system 400 may include the document decoder 130, the document interpreter 131 and the data repository 175 of the system 100, which is described with respect to FIG. 1. The feature matching system 400 may also include a content server 401 which is further described below, and the network 119 includes the Internet. The feature matching system 400 can identify content matching the documents identified by the user 630. The similar content may be delivered to the user 630 via the Internet. In an example, the document decoder 130 may use a conditional random field extraction to extract tables.

Figure 4B:
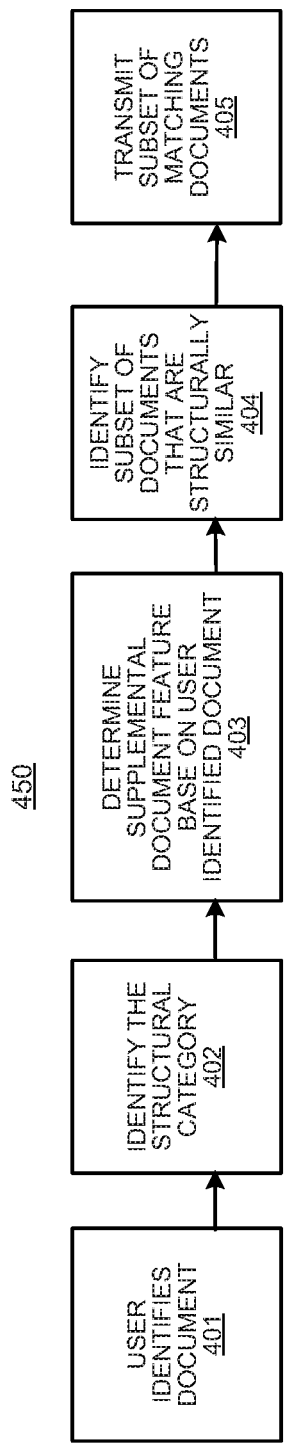
FIG. 4B shows a flow chart of a method to identify structurally similar content, according to an example of the present disclosure.

FIG. 4B shows an example of a method 450 performed by a user and the feature matching system 400. The method 450 is described with respect to the system 400 by way of example. At 451, user 630 identifies a document, such as a document 451*a* with data in tabular format. At 402, the content server 401 identifies semantic feature category 151 using the semantic feature category classifier 120. At 403, the document interpreter 131 determines, based on identified document 451*a*, a document feature. For example, the documents in the data repository 175 may be documents of a logistics shipping service. The documents in the data repository 175 may be formatted with tables separated using tabs. There may be subgroups within the tables that may need to be identified and detected. The document interpreter 131 may identify the structural feature parameters such as the two tabs.

At 404, the document interpreter 131 identifies a subset of documents in the data repository 175 that has the same structural feature category as the document 451*a*. As described above with reference to FIG. 1, the document interpreter 131 may determine the the matching subset of documents based on the trained structural feature category classifier 121. For example, the document interpreter 131 may identify all documents with a tabular data format and a subgroup within the table.

At 405, the document interpreter 131 may transmit via the network interface, the matching subset of documents to a client application for display by the client application.

Figure 5:
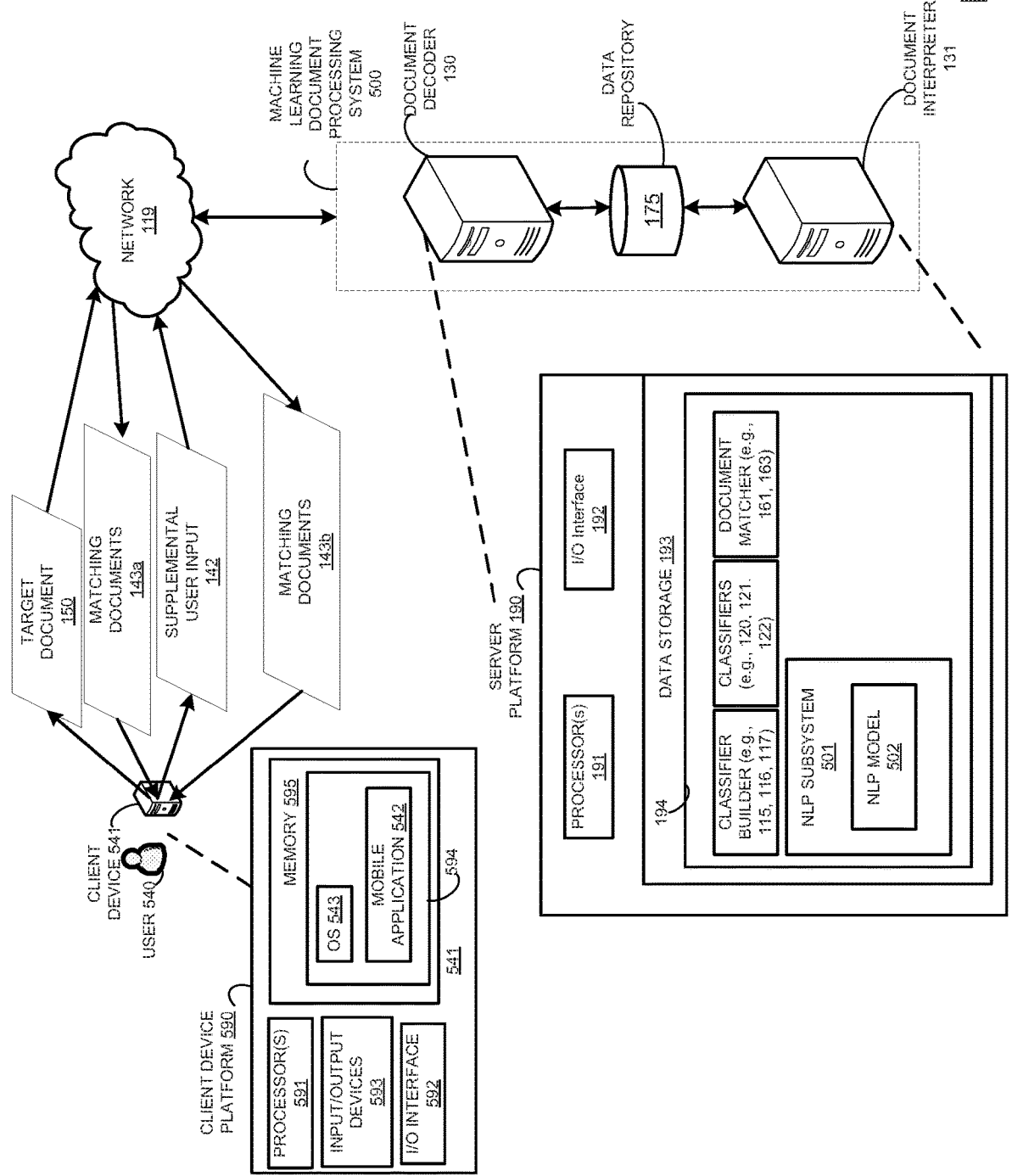
FIG. 5 shows a machine learning document processing system, according to another example of the present disclosure.

With reference to FIG. 5, there is shown a system diagram of the system 500. The system 500 may include the components of the system 100 but may further include a natural language processing (NLP) subsystem 801 to provide interactive and enhanced document querying and matching. As discussed above with respect to the system 100 shown in FIG. 1 and other figures discussed above, the semantic feature category classifier builder 115 may build the semantic feature category classifier 120, and the structural feature category classifier builder 116 may build the structural feature category classifier 121. The semantic feature category classifier 120 may determine textual features of a document. The semantic feature category classifier 120 may also determine the semantic feature category based on the the textual features identified using a plurality of feature machine learning classifiers such as k-NNs or CNNs that are trained to identify semantic feature category. In another example, the structural feature category classifier 121 may output structural features as outputs. The semantic feature category classifier 120 may also determine the structural feature category 160 from outputs of the plurality of feature machine learning classifiers. The structural feature category classifier builder 116 may be used to create the structural feature category classifier 121, and the structural feature category classifier 121 may be used to determine features of documents. The document interpreter 131 may use the document comparator 161 and the similarity detector 163 to determine similar documents 165 to a target document, such as document 140*a*. The document 140*a* may be selected by a user from the documents 140 in the data repository 175.

Figure 8:
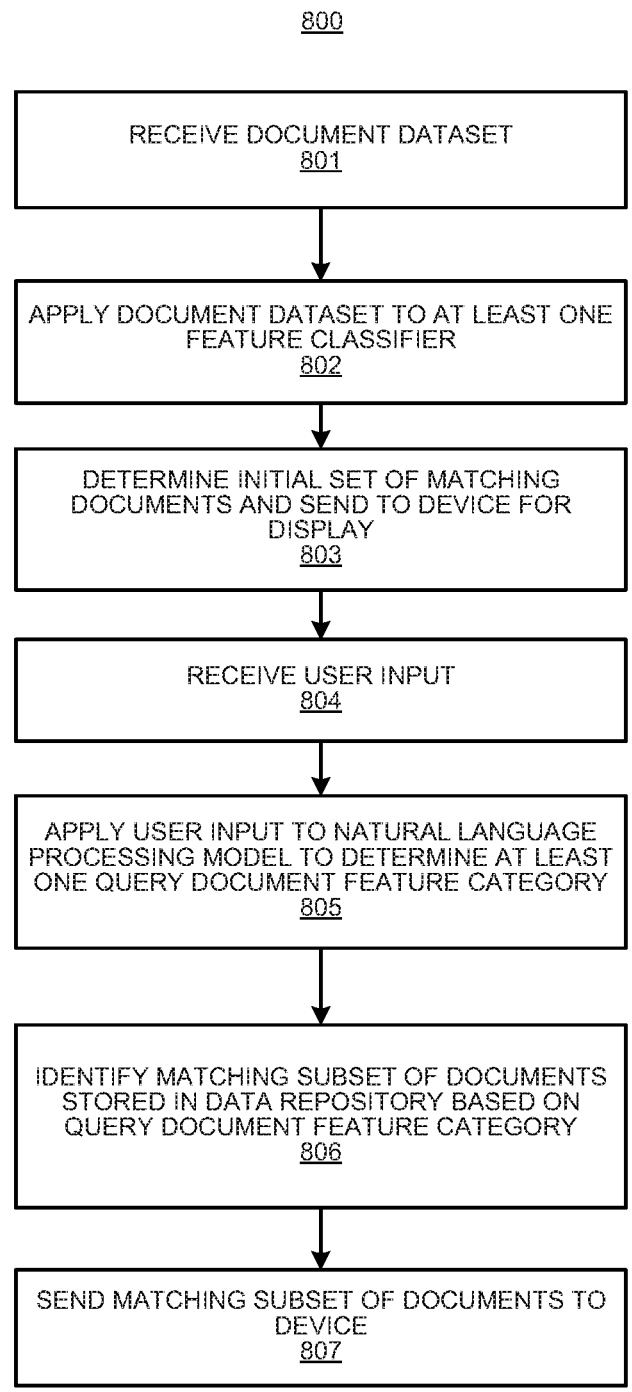
FIG. 8 shows a flow chart of a method for document matching, according to an example of the present disclosure.

The system 500 may include the components of the system 100 to determine similar documents 165 to the document identified by the user such as the document 140*a*. For example, as shown in FIG. 8, the system 500 may include document decoder 130 and document interpreter 131 similar to the system 100. Also, the system 500 may include the classifier builder (e.g., 115 and 116) and the classifiers (e.g., 120 and 121) and the document matcher (e.g., 161 and 163) which may be used to determine similar documents to a document such as a document 140*a*. A document matching subsystem of the system 500 may include the document matcher, the classifiers and other components for determining matching documents. The document matching subsystem may determine documents that are similar to the document 140*a* obtained from the user or are similar to features obtained from the user as a user input to determine a matching subset of documents as is further discussed below, and transmit the matching subset of documents to the client device 541.

The system 500 includes the NLP subsystem 801 that may create and store a Natural language processing (NLP) model 502 for determining a document query feature based on user input. The classifiers 120, 121 may store the documents with their structural feature category 160 and semantic feature category 151 for each document, such as in the form of meta data for each document, in the data repository 175. The features of each document may be used to further query the data repository 175 for matching documents based on the user input 142.

The system 500 may communicate with a client application 542 hosted on a client device 541 to perform various operations discussed below. An example of a platform 590, including hardware and software components for the client device 541, is shown. The client device 541 includes a processor (e.g., one or more processors) and data storage, including memory 895. The processor 591, for example, is an integrated circuit. The processor 591 may be a chipset with central processing unit and/or custom processing circuits, such as an ASIC, field-programmable gate array and/or a graphic processing unit. The processor 591 may run an operating system (OS) 543 and applications, including the client application 542. The OS 543 and the applications may include machine readable instructions 494 stored in the memory 895 or other non-transitory data storage and executed by the processor 591. The client device 541 includes input/output (I/O) devices 593 such as a keyboard, display (e.g., touch screen displays), speaker, microphone, digital camera, and the like. The client device 541 may include I/O interface 592 (e.g., one or more I/O interfaces) which may be wired and/or wireless, for communicating with other devices. For example, the I/O interface 592 may include a Wi-Fi interface, a cellular interface, a Bluetooth interface, and the like. The client device 541 may include a smart phone, tablet, laptop, or another type of client device. Also, a client device may be another type of devices, such as a desktop computer, workstation, and the like may be used. Also, client application 542 may be a web application may be used to provide one or more operations of the client application 542.

Examples of operations performed by the client device 541 and the system 500 are now described. A user 540 may launch the client application 542 on the client device 541 and be prompted to select a representative document such as document 140*a*. For example, the client application on the client device 541 may be an application that retrieves documents that are similar to the document 140*a* based on document matching and may facilitate processing of documents. The user 540 may capture an image of the document for finding similar documents in the data repository 175. The user 540 may take a picture of the document with a camera of the client device 541, e.g., document 140*a*. The client application 542 may transmit the document 140*a* to the system 500 via the network 119. The system 500 determines matching documents 143*a* from the data repository 175 that match the document 140*a*. For example, such as described with respect to FIG. 1, the semantic feature category classifier 120 may be used to identify semantic features in a document, similar to the semantic features in the document 140*a*. Moreover, the structural feature category classifier 121 may be used to determine structural features of the document in the data repository 175 that are similar to the structural features of the document 140*a*. The document comparator 161 and the similarity detector 163 may determine documents from the data repository 175 that match the document 140*a*, such as documents (e.g., matching documents 143*a*) that match an object extracted from the document 140*a*.

The user 540 may provide user input 142 including additional features to identify documents similar to the matching documents 143*a*. In an embodiment, the system 500 may transmit the matching documents 143*a* to the client device 541, and the client application 542 displays the matching documents 143*a* on the client device 541. The user 540 may view the matching documents 143*a*, and provide user input 142 to further define the category of documents the user is interested in obtaining. In another embodiment, the user may provide the user input 142 without the system 500 providing the matching documents 143*a* to the client application 542. In an example, the user 540 may provide the user input 142 in the form of speech or text. Also, speech input may be converted to text by a speech-to-text module of the client application 542. The client application 542 transmits the user input 142 to the system 500 via the network 119, and the system 500 receives the user input 142 and provides the user input 142 to the NLP model 502. The NLP model 502 may determine one or more document query features from the user input 142. The document interpreter 131 may use the one or more document query features and the features tagged to the documents stored in the data repository 175 to determine a final set of matching documents, e.g., matching documents 143*b*. The system 500 may transmit the matching documents 143*b* to the client device 541, and the client application 542 may display the matching documents 143*b*. The process may be repeated any number of times. For example, the user 540 may provide user input after viewing the matching documents 143*b*, and the system 500 may determine a final set of matching documents from the matching documents 143*b* and the user input for transmission to the client device 541. In an example, the client application 542 displays the matching documents 143*b*, and the user 540 may select a document of the matching documents 143*b* to determine more information about a product displayed in the matching document and/or to purchase the product.

Figure 6:
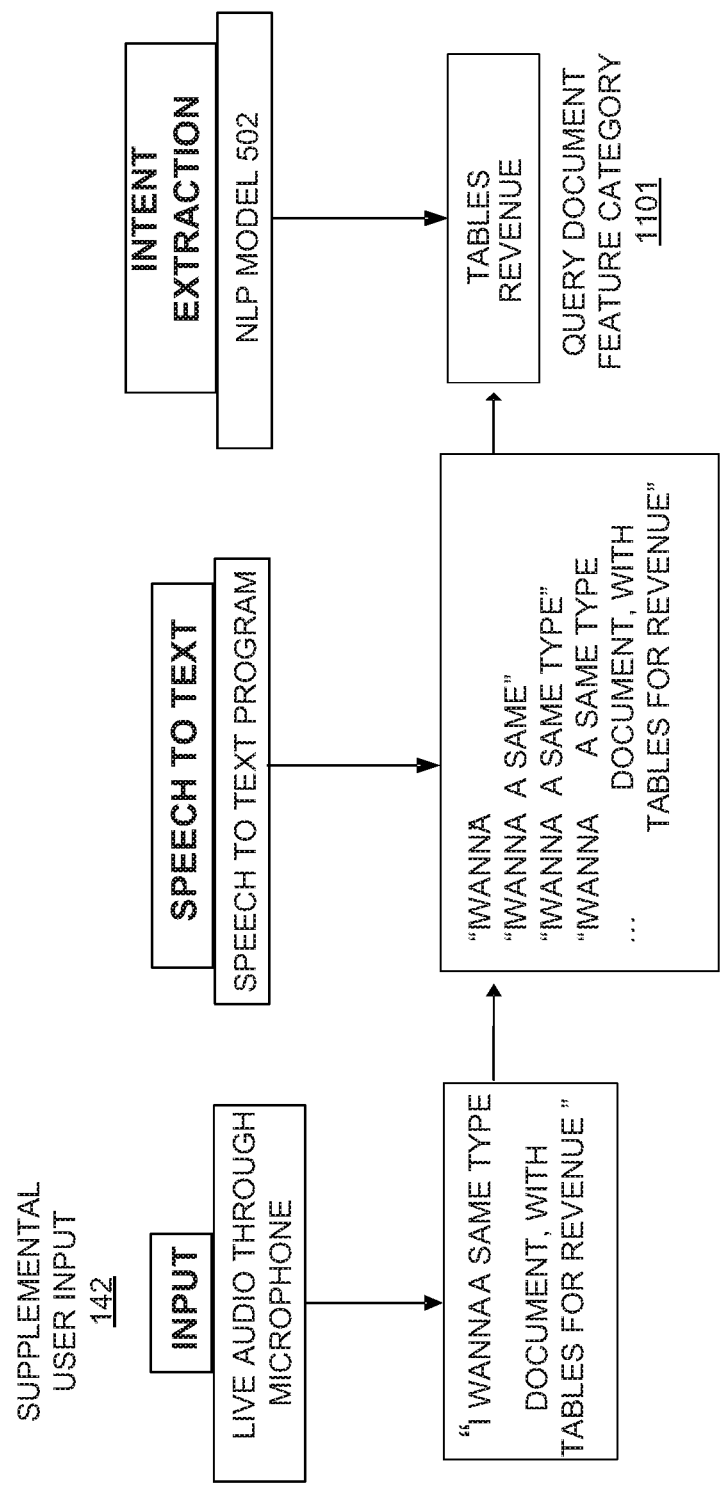
FIG. 6 shows a data flow diagram, according to an example of the present disclosure.

FIG. 6 shows an example of using the NLP model 502. For example, the user input 142 may include speech, such as "I wanna same type document with tables for revenue." The speech may be converted to text by a speech-to-text program or module, and the text is provided to the NLP subsystem 801. The NLP subsystem 801 applies the text to the NLP model 502 to determine the document feature 1101 from the text. For example, the NLP subsystem 801 determines that the intent of the user's speech was to query for the same structural features as shown in the document 140*a*, with tables for revenue. The NLP model 502 may be trained according to a dictionary of terms based on the semantic feature category. The terms may include the tag types and classes discussed above. Also, terms such as "same" or "different" or "but" or "and" may be used to determine whether features of the document 140*a* should be modified or whether additional features should be used to query for the matching documents 143*b*. In an example, the Natural Language Toolkit (NLTK), which an off-the-shelf suite of libraries and programs for symbolic and statistical natural language processing for English written in the Python® programming language, may be used to build the NLP model 502.

Figure 7:
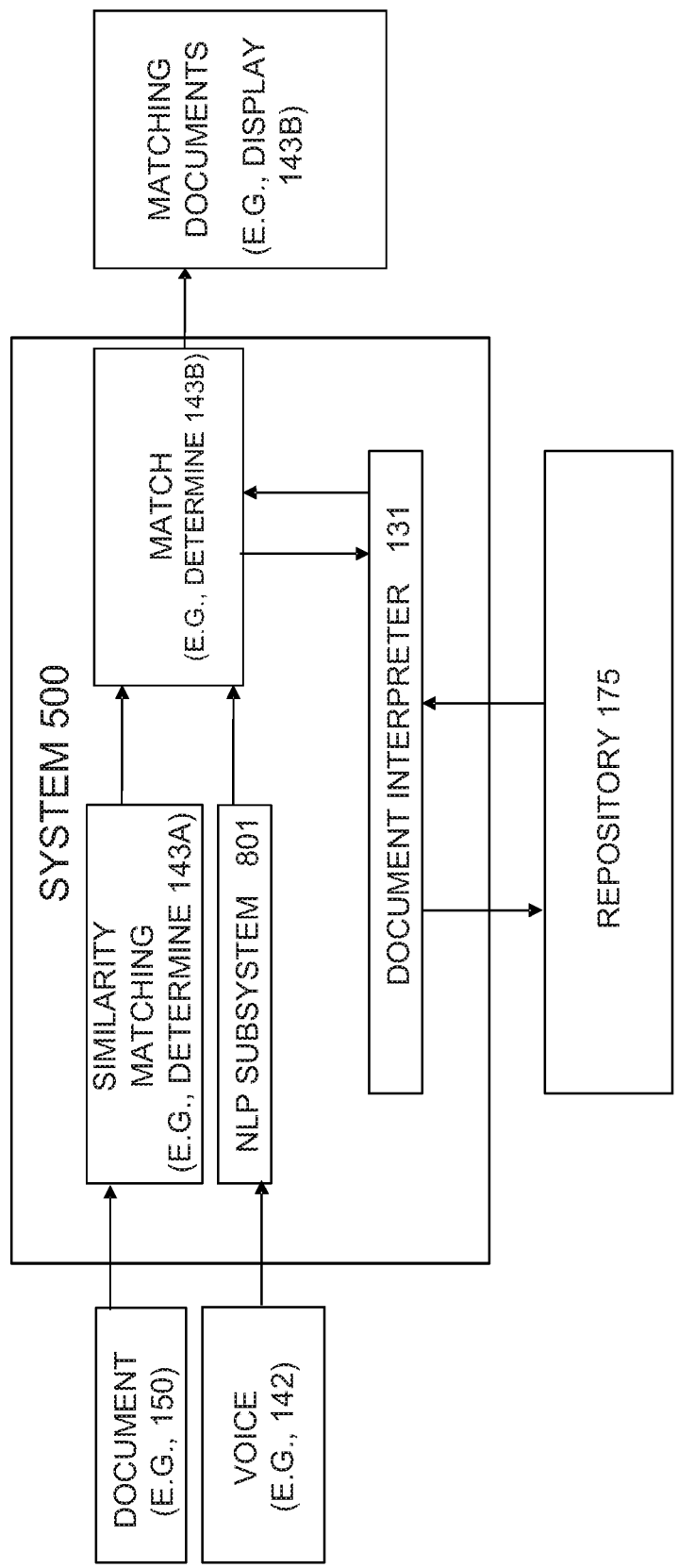
FIG. 7 shows a data flow diagram for generating a subset of matching documents, according to an example of the present disclosure.

FIG. 7 shows an example of the system 500 identifying similar documents, which may include documents with similar structural features or similar semantic features or both such as the matching documents 143*b*. The input to the system 500 may be a document received from the client application 542, such as the document 140*a*. The input to the system 500 may also include the user input 142. In an example, the user input may be speech. Similarity matching performed by the system 500 may determine the matching documents 143*a*. The NLP subsystem 801 may determine the document feature 1101 from the user input 142, and the system 500 determines the matching documents 143*b* based on the query such as query document feature 1101 determined from the user input, and documents in the data repository 175. The matching documents 143*b* may be displayed by the client application 542 on the client device 541.

FIG. 8 shows an example of a method 800. The method 800 may be performed by the system 500 or another system to perform document matching. The method 800 is described by way of example as being performed by the system 500 and may be performed by other systems. The method 800 and other methods described herein may be performed by one or more servers or other types of computers including at least one processor executing machine readable instructions embodying the methods. For example, the document decoder 130 and/or the document interpreter 131 shown in FIG. 8 may store machine readable instructions 194 embodying the methods, and processor 191 may execute the machine readable instructions. Also, one or more steps of the method 800 may be performed according to the steps of the method 300 shown in FIG. 3. For example, the method 300 includes steps 301-306 for identifying similar documents. Also, one or more of the steps of the method 800 and steps of other methods described herein may be performed in a different order than shown or substantially simultaneously.

At 801, the system 500 receives a document dataset such as documents 140. The documents 140 may include the document 140*a*. In an example, the documents 140 may be received by the system 500 from the client device 541 executing the client application 542. The system 500 receives the document 140, via a network interface (e.g., I/O interface 192), connecting a computer of the system 500 to the network 119.

At 802, the system 500 applies each document in the document dataset to at least one feature machine learning classifier to determine the possible document feature categories of the documents in the document dataset. For example, the document 140a may be applied to the semantic feature category classifier 120 and/or the structural feature category classifier 121 to determine the semantic features of the document 140a. Thus, the system 500 may determine the document feature categories. The document feature categories may, in turn, be based on the semantic feature categories, and/or structural feature categories as discussed above with reference to FIG. 3.

For example, the document decoder 130 may determine the structural feature category (e.g., formatting, simple and complex documents, topic based document grouping, sensitive and non-sensitive document segregation, etc.) for the document dataset. Similarly, the document decoder 130 may determine the semantic feature category such as a document with a particular semantic phrase for the document dataset.

In an example, once the system 500 identifies the document features categories, the document decoder 130 may classify a document, e.g., 140a from the document dataset to a semantic feature category and/or structural feature category. The document decoder 130 may classify the document 140a based on the feature category that has the highest probability or confidence value among the categories determined for the dataset 140. In an example, the document 140a may be applied to a first machine learning classifier such as the semantic feature category classifier 120 and a second machine learning structural feature category classifier 121 to determine feature category of the document 140a. In an example, the first machine learning classifier and the second machine learning classifier may use the k-dimensional vector space as discussed above with respect to method 300 to determine the semantic feature category.

At 803, the system 500 may determine an initial set of matching documents 143a that are similar to each other. For example, the system 500 may determine the dataset has the following semantic categories: those with unsatisfied customer emails, those with satisfied customer emails and those with emails that do not express satisfaction or dissatisfaction. To determine the semantic textual features of each document in the document dataset, the system 500 may determine the textual features of each document in the document dataset. The system 500 may then determine the semantic features that correspond to each of the textual features for each of the documents. The system 500 may then determine the semantic features of the documents in the dataset, such as most or all the document in the dataset based on the semantic features in each of the documents. The system 500, may the classify the semantic features of each of the documents in the dataset based on the determined semantic features for the dataset and the semantic features of the document 140a.

In another example, the system 500 may determine the dataset has the following structural categories: simple documents, complex documents and hybrid documents in the dataset. The system 500, may then classify each document in the dataset into simple, complex or hybrid based on the semantic features in each document. The system 500 may determine the semantic features that correspond to each of the structural features for each of the documents. The system 500 may then determine the structural features of the documents in the dataset, such as all the documents in the dataset based on the determined structural features in each of the documents. The system 500, may then classify the structural features in each of the documents in the dataset based on the determined structural features for the dataset and the semantic features of the document 140a.

In an example, the document decoder 130 may determine the initial set of matching documents based on the k-dimensional vector space identified using the semantic feature vectors and the structural feature vectors. The documents that are close to each other may share properties or have the same document feature category 275. In an example, the matching documents 143a may be determined according to the similarity matching described with respect to steps 305-306 of the method 300. Also, the matching documents 143a may be sent to the client application 542 via the network 119, which may prompt the user 540 to provide the user input 142.

At 804, the system 500 may receive the user input 142 via the network 119. In an example, the user may select a document 140a from the matching documents 143a sent to the client application 542 at 803. The user input 142 may be a document or a document feature category 275, a semantic feature category or a structural feature category. In an example, the user input 142 may be provided as speech or text further explaining query features such as document feature category 275 and the like.

At 805, the system 500 may apply the user input 142 to the NLP model 502 to determine at least one query document feature category 275. The system 500 may determine the at least one query document feature category 275 based on the document 140a selected by the user, or based on the user input 142 providing a document feature category 275. For example, the user input 142 may include the following speech "I wanna a same type document, with tables for revenue." The speech may be converted to text, and the text is provided to the NLP model 502 to determine at least one query document feature category.

In an example, the at least one query document feature category determined from the output of the NLP model 502 may be used to determine documents that are similar in the document dataset.

At 806, the system 500 may identify a matching subset of the documents (e.g., the matching documents 143b) stored in the data repository 175 that match the user input 142. For example, assume the user input 142 is the document 140a, and the system 500 determines that the at least one query document feature category is a feature of the document 140a selected by the user. The system 500 may be use the document interpreter 131 to identify a final set of matching documents that are similar to the document 140a in the data repository 175. In another example, the system 500 may identify documents that are similar to the query document feature category. The system 500 may use the k-dimensional vector space to identify the nearest neighbor.

At 807, the final subset of documents 143b may be transmitted to the client application 542 via the network 119. Then, the user 540 may view the matching subset of documents to the client application for display by the client application. The system 500 may transmit the matching documents 143b to the client device 541, and the client application 542 may display the matching documents 143b. The method 800 may be repeated any number of times. For example, the user 540 may provide user input after viewing the matching documents 143b, and the system 500 may determine a final set of matching documents from the matching documents 143b and the user input for transmission to the client device 541.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A machine learning document processing system comprising:
a data repository storing documents;
a network interface to connect the machine learning document processing system to at least one network;
at least one processor to execute machine readable instructions stored on at least one non-transitory computer readable medium;
at least one data storage to store a plurality of document feature machine learning classifiers;
wherein the machine readable instructions comprise machine readable instructions for a document decoder, and the at least one processor is to execute the machine readable instructions for the document decoder to, for each document in the data repository:
apply the document in the data repository to a semantic feature machine learning classifier and a structural feature machine learning classifier;
determine a semantic feature category from the output of the semantic feature machine learning classifier;
determine a structural feature category from the output of the structural feature machine learning classifier; and
determine a document feature category for each document in the data repository based on the semantic feature category and the structural feature category;
wherein the machine readable instructions comprise machine readable instructions for a document interpreter, and the at least one processor is to execute the machine readable instructions for the document interpreter to:
receive, via the network interface, a user input from a client application connected to the machine learning document interpreter via the at least one network;
determine at least a query document feature category based on the user input;
identify a matching subset of the documents stored in the data repository classified by the document decoder based on the determined query document feature category; and
transmit, via the network interface, the matching subset of the documents to the client application for display by the client application.

2. The machine learning document processing system of claim 1, wherein to determine semantic feature category the at least one processor is to:
determine textual features for each document in the data repository;
determine semantic feature vectors for the determined textual features for each document;
determine a semantic proximity value for each document based on the semantic features for each document; and
determine the semantic feature category of each document based on the semantic proximity value of the document to other documents in the data repository.

3. The machine learning document processing system of claim 1, wherein to determine structural feature category the at least one processor is to:
determine structural features for each document in the data repository;
determine structural feature vectors for the determined structural feature for each document;
determine a structural proximity value for each document to other documents in the data repository based on the structural features for each document; and
determine the structural feature category of each document based on the structural proximity value of the document to other documents in the data repository.

4. The machine learning document processing system of claim 1, wherein to determine document feature category the at least one processor is to:
determine textual feature vectors for each document in the data repository;
determine semantic feature vectors for the determined textual feature vectors for each document in the data repository;
determine structural feature vectors for each document in the data repository;
determine structural feature vectors for the determined textual feature vectors for each document;
determine a document proximity value for each document to other documents in the data repository based on the structural feature vectors and the semantic feature vectors; and
determine a document feature category of each document based on the document proximity value of the document to other documents in the data repository.

5. The machine learning document processing system of claim 1, wherein the document decoder has machine readable instructions to:
determine a count of documents in each document feature category in the data repository;
determine whether the count of documents in a document feature category is skewed with respect to the count of documents in other document feature categories in the data repository; and
determine the documents stored in the data repository are not sufficient in response to the determined skew.

6. The machine learning document processing system of claim 1, wherein to determine document feature category the at least one processor is to:
determine a count of documents in each of the determined document feature category;
determine whether the determined document feature category are skewed with respect to certain document feature category based on the count of documents in each of the determined document feature category; and
output a request for documents in the certain document feature category to rectify the determined skew in response to the determined skew.

7. The machine learning document processing system of claim 1, wherein to determine the document feature category the at least one processor is to:
determine documents with semantic errors; and
classify documents in the data repository based on the semantic errors.

8. The machine learning document processing system of claim 1, wherein to determine the document feature category the at least one processor is to:
determine document language; and
classify the documents in the data repository based on the document language.

9. The machine learning document processing system of claim 1, determine the document feature category the at least one processor is to:
determine a document topic; and
classify the documents in the data repository based on the document topic.

10. The machine learning document processing system of claim 1, wherein to determine the document feature category the at least one processor is to:
  determine whether the document contains a personally identifiable information; and
  classify the document based on the personally identifiable information.

11. The machine learning document processing system of claim 1, wherein to determine the document feature category the at least one processor is to:
  determine a count of the structural features in each document;
  determine whether the document is structurally complex based on the determined count; and
  classify the document based on whether the document is structurally complex.

12. A machine learning document classification system comprising:
  at least one processor to:
    receive a document dataset;
    apply each document in the document dataset to a first machine learning classifier to determine a semantic feature category;
    apply each document in the document dataset to a second machine learning classifier to determine a structural feature category;
    determine an initial subset of documents in the document dataset that are similar to each other based on the semantic feature category and the structural feature category;
    receive user input associated with the initial subset of documents;
    apply the user input to a natural language processing (NLP) model to determine at least one query document feature category; and
  identify a final subset of documents of the document dataset based on the at least one query document feature category.

13. The machine learning document classification system of claim 12, wherein to determine the at least one query document feature category the at least one processor is to:
  determine documents with semantic errors; and
  classify documents in the document dataset based on the semantic errors.

14. The machine learning document classification system of claim 12, wherein to determine the semantic feature category the at least one processor is to:
  determine textual features of each document in the document dataset;
  determine semantic features for each of the textual features for each of the documents;
determine semantic features in the documents in the document dataset based on the determined semantic features for each of the documents; and
  determine the semantic feature category for each document based on the determined semantic features for the document dataset and the semantic features in each document.

15. The machine learning document classification system of claim 14, wherein to determine the structural feature category the at least one processor is to:
  determine structural features of each document in the document dataset;
  determine structural features in the document dataset based on the determined semantic features for each of the documents; and
  determine the structural feature category for each document based on the determined structural features for the document dataset and structural features in each document.

16. The machine learning document classification system of claim 14, wherein to determine a document feature category the at least one processor is to:
  determine structural features of each document in the document dataset;
  determine structural features in the document data set based on the determined semantic features for each of the documents;
  determine textual features of each document in the document dataset;
  determine semantic features for each of the textual features in each of the documents;
  determine semantic features in the document dataset based on the determined semantic features for each of the documents; and
  determine the document feature category based on the determined semantic features and the structural features for the document dataset.

17. The machine learning document classification system of claim 16, wherein the document decoder has machine readable instructions to:
  determine a count of documents in the initial subset of the document dataset;
  determine whether the count of documents in the initial subset is less than a threshold in a skewed document feature category; and
  determine the documents stored in the data repository are skewed in response to the determination that the count is less than the threshold.

18. The machine learning document classification system of claim 17, wherein to determine a document feature category the at least one processor is to:
  request documents in the document feature category with a skew.

19. A client device comprising:
  a camera;
  a display;
  a microphone;
  at least one processor; and
  a non-transitory computer readable medium storing machine readable instructions for a client application, wherein the at least one processor is to execute the machine readable instructions to:
  transmit, via a network interface, a target document to a machine learning document processing system, wherein the machine learning document processing system stores documents;
  receive an initial subset of the document dataset from the machine learning document processing system that are similar to each other, wherein the machine learning document processing determines the initial subset of the document dataset based on a comparison of features of each document and the features of the document dataset;
  display the initial subset of the document dataset on the display;
  receive, via the microphone, speech describing user input in response to displaying the initial subset of the document dataset;
  transmit the speech or text determined from the speech, via the network interface, to the machine learning document processing system, wherein the machine learning document processing system applies the speech or the text to a natural language processing model to determine document feature, and identifies a matching subset of the document dataset from the query document feature category and the features of the initial subset of the document dataset;

receive the matching subset of the document dataset, via the network interface, from the machine learning document processing system; and display the matching subset of the document dataset on the display.

20. The client device of claim 19, wherein the matching subset of the document dataset has structural features similar to the document identified in a query.

\* \* \* \* \*